United States Patent
Cho et al.

(10) Patent No.: US 9,667,908 B2
(45) Date of Patent: May 30, 2017

(54) IMAGE RECORDING SYSTEM

(71) Applicant: HANWHA TECHWIN CO.,LTD., Changwon-si (KR)

(72) Inventors: SungBong Cho, Changwon-si (KR); SungHoon Lee, Changwon-si (KR); SeokHo Chae, Changwon-si (KR); HyoJin Kim, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 323 days.

(21) Appl. No.: 14/506,806

(22) Filed: Oct. 6, 2014

(65) Prior Publication Data

US 2015/0208021 A1    Jul. 23, 2015

(30) Foreign Application Priority Data

Jan. 20, 2014 (KR) ................ 10-2014-0006736

(51) Int. Cl.
| | |
|---|---|
| H04N 5/77 | (2006.01) |
| H04N 5/775 | (2006.01) |
| G11B 27/34 | (2006.01) |
| G11B 27/30 | (2006.01) |
| G11B 27/031 | (2006.01) |
| G11B 27/32 | (2006.01) |
| G06K 9/00 | (2006.01) |
| H04N 9/804 | (2006.01) |
| H04N 9/82 | (2006.01) |

(52) U.S. Cl.
CPC ........... *H04N 5/77* (2013.01); *G06K 9/00718* (2013.01); *G11B 27/031* (2013.01); *G11B 27/309* (2013.01); *G11B 27/327* (2013.01); *G11B 27/34* (2013.01); *H04N 9/8042* (2013.01); *H04N 9/8205* (2013.01)

(58) Field of Classification Search
USPC ................. 386/226, 223–224, 227, 228, 230
See application file for complete search history.

(56) References Cited

U.S. PATENT DOCUMENTS

| | | | |
|---|---|---|---|
| 8,311,277 B2 | 11/2012 | Peleg et al. | |
| 9,313,556 B1* | 4/2016 | Borel | ................ H04N 21/8549 |
| 2004/0218099 A1* | 11/2004 | Washington | ............. H04N 5/77 348/571 |
| 2010/0125581 A1* | 5/2010 | Peleg | ................ G06F 17/30811 707/737 |
| 2011/0075042 A1* | 3/2011 | Wang | ...................... G06T 5/002 348/669 |
| 2012/0293687 A1 | 11/2012 | Karn et al. | |
| 2013/0081082 A1 | 3/2013 | Riveiro Insua et al. | |

(Continued)

FOREIGN PATENT DOCUMENTS

KR    10-2006-0028307 A    3/2006

*Primary Examiner* — Helen Shibru
(74) *Attorney, Agent, or Firm* — Sughrue Mion, PLLC

(57) ABSTRACT

An image recording system including a component capable of displaying and processing of images such as a central processing unit (CPU)/digital signal processor (DSP) that may be installed in a network video recorder (NVR) so that the image recording system may be used to implement a video summary/video synopsis technology in an embedded NVR/digital video recorder (DVR)/set-top box (SETTOP) system having a Host CPU and a plurality of DSP cores.

9 Claims, 13 Drawing Sheets

(56) References Cited

U.S. PATENT DOCUMENTS

| | | | | |
|---|---|---|---|---|
| 2015/0156281 A1* | 6/2015 | Krieger | ................... | H04L 67/42 709/203 |
| 2016/0007100 A1* | 1/2016 | Lim | ........................ | H04N 5/91 386/241 |
| 2016/0021333 A1* | 1/2016 | Lim | ....................... | H04N 5/765 386/248 |

* cited by examiner

FIG. 4

| | Time | Region | Color | Comment |
|---|---|---|---|---|
| 401 | 9:29 | [42,24,80,120] | Red | User1 |
| 402 | 9:32 | [42,24,80,130] | White | User2 |
| 403 | 10:32 | [42,24,80,130] | Red | User4 |
| 404 | 11:46 | [42,24,80,130] | Red | User5 |
| | ... | ... | ... | ... |

IMAGE RECORDING SYSTEM

CROSS-REFERENCE TO RELATED APPLICATION

This application claims priority from Korean Patent Application No. 10-2014-0006736, filed on Jan. 20, 2014, in the Korean Intellectual Property Office, the disclosure of which is incorporated herein in its entirety by reference.

BACKGROUND

1. Field

Apparatuses and methods consistent with exemplary embodiments relate to a method for generating a video summary, and more particularly, to a method for generating a video summary in an image recording system such as a network video recorder (NVR) without a separate sever.

2. Description of the Related Art

A related art system for generating and reproducing a video summary image includes a system for transmitting an image, a system for transmitting images at 10-second intervals, a system for generating a compressed video summary image, and a client system for reproducing the compressed video summary image.

Video Synopsis is a technology that reduces a long archived video into a short video summary. It may include tracking and analyzing moving objects (e.g. events), and converting video streams into a database of detected objects and activities. A synopsis video clip is a generated clip in which objects and activities that originally occurred in different times are displayed simultaneously.

SUMMARY

Exemplary embodiments overcome the above disadvantages and other disadvantages not described above. Also, an exemplary embodiment is not required to overcome the disadvantages described above, and an exemplary embodiment may not overcome any of the problems described above.

One or more exemplary embodiments provide an image recording system which generates a video summary without requiring a separate server. The image recording system may include or be configured as an embedded network video recorder (NVR)/digital video recorder (DVR)/ set-top box (SETTOP) system.

According to an aspect of an exemplary embodiment, there is provided an image recording system including a component capable of displaying and processing of images such as a central processing unit (CPU)/digital signal processor (DSP) that may be installed in an NVR so that the image recording system may be used to implement a video summary (i.e., video synopsis) technology without requiring a separate server in an embedded NVR/DVR/SETTOP System having a Host CPU and a plurality of DSP Cores.

According to an aspect of an exemplary embodiment, there is provided an image recording system including: a host system and a sub-system. The host system includes: an original image storage configured to store an original image acquired by at least one network camera; a compressed image storage configured to store a compressed video summary image corresponding to the original image; a first peripheral component interconnect express (PCIe) data communicator configured to, using a PCIe communication protocol, perform data communication within the host system, and transceive data with the sub-system; and a controller configured to control the original image storage, the compressed image storage, the first PCIe data communicator, and a display of the sub-system. The sub-system includes: an original video processor configured to generate a video summary of an image received from the host system; a second PCIe data communicator configured to, using the PCIe communication protocol, perform data communication with the host system, perform data communication within the sub-system, and transmit the video summary to the host system; and the display configured to display the video summary.

According to an aspect of another exemplary embodiment, there is provided an image recording system including: a host system and at least one sub-system configured communicate with each other using a peripheral component interconnect express (PCIe) communication method. The host system is further configured to store an original image acquired by at least one network camera and a compressed video summary image of the original image. The at least one sub-system is further configured to receive the original image from the host system, process the original image, and generate a video summary corresponding to a specific time interval of the original image. The image recording system is configured to display the video summary which includes object information of an object detected by an advanced motion detection (AMD) method during the specific time interval of the original image and time information of the object. When more than one object is detected in a specific area of the displayed video summary during the specific time interval, the detected objects are displayed in an overlay state in the specific area.

According to an aspect of another exemplary embodiment, there is provided a method of generating a video summary of a video captured by a network camera of image recording system including a host system and a sub-system combined as a single device, the method including: receiving, in the host system, the video captured by the network camera; storing, in the host system, the video captured by the network camera; transmitting, from the host system to the sub-system, the video captured by the network camera, using a peripheral component interconnect express (PCIe) communication method; generating, by the sub-system, a video summary corresponding to a specific time interval of the video captured by the network camera; and displaying, by the sub-system, the video summary. The video summary includes object information and time information of at least one object detected in the video captured by the network camera during the specific time interval.

Additional aspects will be set forth in part in the description which follows and, in part, will be apparent from the description, or may be learned by practice of the exemplary embodiments.

BRIEF DESCRIPTION OF THE DRAWINGS

These and/or other aspects will become apparent and more readily appreciated from the following description of the exemplary embodiments, taken in conjunction with the accompanying drawings, in which:

FIG. 4 is a table of an object information list of an original video image displayed on a display of an image recording system, according to an exemplary embodiment;

DETAILED DESCRIPTION OF EXEMPLARY EMBODIMENTS

Figure 1:
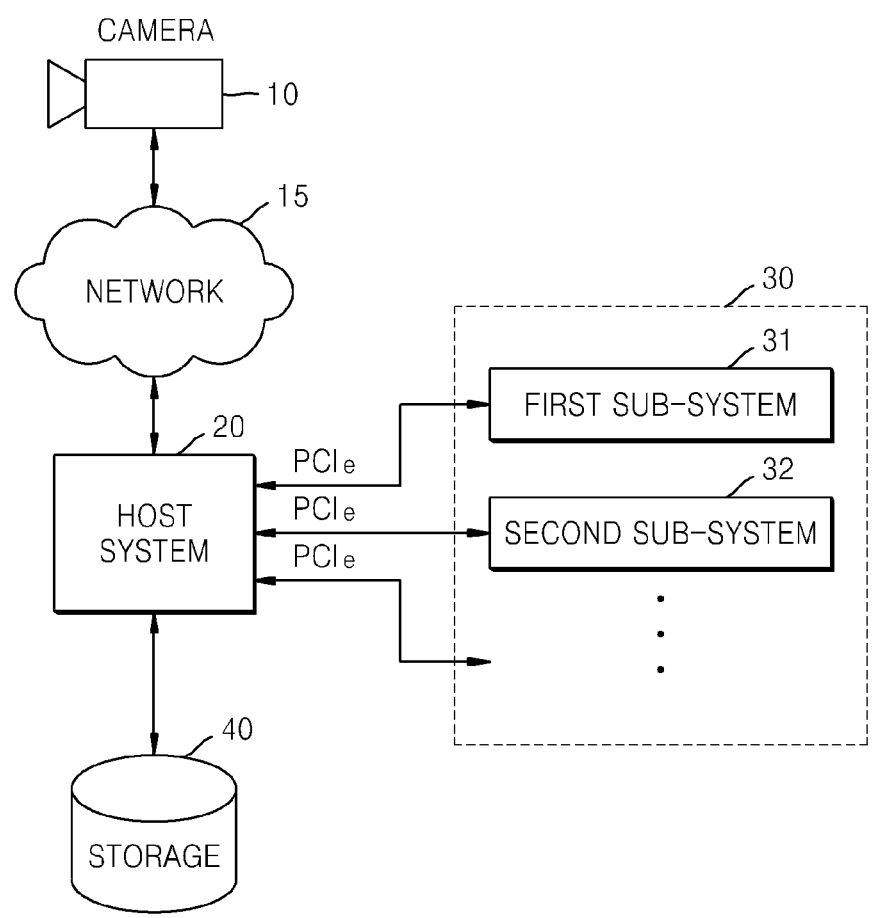
FIG. 1 is a schematic view of an image recording system according to an exemplary embodiment.

Certain exemplary embodiments will now be described in greater detail with reference to the accompanying drawings.

In the following description, like reference numerals refer to like elements throughout, even in different drawings. In this regard, the exemplary embodiments may have different forms and should not be construed as being limited to the descriptions set forth herein. Accordingly, the exemplary embodiments are merely described below, by referring to the figures, to explain aspects of the present description. Also, well-known functions or constructions are not described in detail since they would obscure the exemplary embodiments with unnecessary detail.

In the exemplary embodiments described below, terms such as "first" and "second" are not intended to limit the scope of the exemplary embodiments, but are intended to distinguish one component from another. Further, a singular expression includes a plural expression unless clearly stated otherwise. Still further, terms such as "include" and "have" do not exclude the possibility of addition of one or more other characteristics or features.

Rather, these exemplary embodiments are provided so that this disclosure will be thorough and complete, and will fully convey the scope of the invention to one of ordinary skill in the art. Sizes of components in the drawings may be exaggerated for convenience of explanation. In other words, since sizes and thicknesses of components in the drawings are arbitrarily illustrated for convenience of explanation, the following exemplary embodiments are not limited thereto.

FIG. 1 is a schematic view of an image recording system according to an exemplary embodiment. Referring to FIG. 1, the image recording system includes a camera 10, a host system 20, a sub-system 30, and a storage device 40. The image recording system shown in FIG. 1 includes only components related to the present exemplary embodiment for convenience of description. However, it would be easily understood by those of ordinary skill in the art that the image recording system may include other general-purpose components in addition to the components shown in FIG. 1.

The camera 10 may capture an image of a monitored area. The camera 10 may encode the obtained image and transmit the encoded image to the host system 20. The camera 10 may also obtain audio of the monitored area and generate an audio signal along with the image and generate metadata. The camera 10 may transmit the image, the audio signal, and the metadata to the host system 20. Although FIG. 1 only shows one camera 10, the image recording system may include a plurality of cameras 10. The detailed configuration of the camera 10 will be described in greater detail below with reference to FIG. 3.

The host system 20 may obtain an image signal from the camera 10. According to one example, the host system 20 may obtain the image signal from the camera 10 through a network 15. According to another example, the host system 20 obtains the image signal from the camera 10 through a serial bus (not illustrated). According to another example, the host system 20 may obtain the image signal from the camera 10 through a cable (not illustrated). However, the method of obtaining the image signal by the host system 20 is not limited to the above examples.

The host system may include a central processing unit (CPU). The host system 20 supports a serial bus protocol. The serial bus protocol includes a peripheral component interconnect (PCI) express (PCIe). The PCIe protocol is a high-speed serial bus standard that allows use of differential signals of 2.5 Gbps and supports various speeds up to 80 Gbps. The host system 20 manages transmission and reception of signals and data between the camera 10, a sub-system 30, and a storage device 40.

The image recording system according to an exemplary may be a loosely-coupled system. In the present exemplary embodiment, the host system 20 and the sub-system 30 may respectively have independent operating systems, and the processor included in each of the host system 20 and the sub-system 30 may independently operate. As such, the host system 20 may distribute data to the sub-system 30 for processing so as to reduce its computational data load.

The host system 20 operates based on a serial bus protocol when transmitting/receiving data to/from the sub-system 30. For example, the host system 20 transmits/receives (i.e., transceives) data to/from the sub-system 30 according to the PCIe protocol. The host system 20 may operate based on a serial bus protocol when transmitting/receiving data to/from the storage device 40. For example, the host system 20 may transmit/receive data to/from the storage device 40 according to the PCIe protocol.

The image recording system includes at least one sub-system 30. For example, the sub-system 30 includes a first sub-system 31 and a second sub-system 32. Each sub-system 30 includes a serial bus interface which receives data from the host system 20 or transmits data to the host system 20. The serial bus interface allows the format of the data processed in each sub-system 30 to be compatible with the serial bus protocol. The serial bus interface may be a PCIe interface which supports the PCIe protocol.

Each sub-system 30 may receive an image signal from the host system 20 and process the image signal. Each sub-system 30 may correspond to at least one processor and may have at least one processor.

Each sub-system 30 may process the image signal by using different methods. Each sub-system 30 may be included in another hardware device such as a microprocessor and a general-purpose computer system.

According to an exemplary embodiment, the sub-system 30 may be divided into a sub-system for real-time image processing and a sub-system for image searching and reproducing.

Furthermore, the number of image receiving channels in a network video recorder (NVR) may be 16, 32, 64, 124 channels, etc. Thus, in an exemplary embodiment, the number of sub-systems 30 may be increased as the number of image receiving channel increases.

Each sub-system 30 may be implemented as a digital signal processor (DSP), an application specific integrated circuit (ASIC) having a specific function, and a system on chip (SoC). Each sub-system 30 is loosely coupled with the host system.

The storage device 40 may receive an image signal from the host system 20 and store the image signal. For example, the host system 20 may transmit an image signal obtained from the camera 10 to the storage device 40, and the storage device 40 may store the image signal. At this time, the image signal may be stored in the storage device 40 in a state encoded by the camera 10. In the present exemplary embodiment, the host system 20 may further obtain an audio signal and metadata from the camera 10 so as to transmit the audio signal and the metadata to the storage device 40. Thus, the storage device 40 may store the audio signal, the image signal, and the metadata.

According to another exemplary embodiment, the host system 20 may store data obtained from the sub-system 30 in the storage device 40. The data obtained from the sub-system 30 may be, for example, an image signal in a decoded state. The host system 20 may obtain the decoded image signal from the sub-system 30 and transmit the image signal to the storage device 40. The storage device 40 may obtain and store the decoded image signal.

According to another exemplary embodiment, the storage device 40 may be integrated in the host system 20, or may be a separate device outside the host system 20.

The data obtained from the sub-system 30 may further include an audio signal and metadata. The storage device 40 may store a decoded image signal, an audio signal, and metadata.

Figure 2:
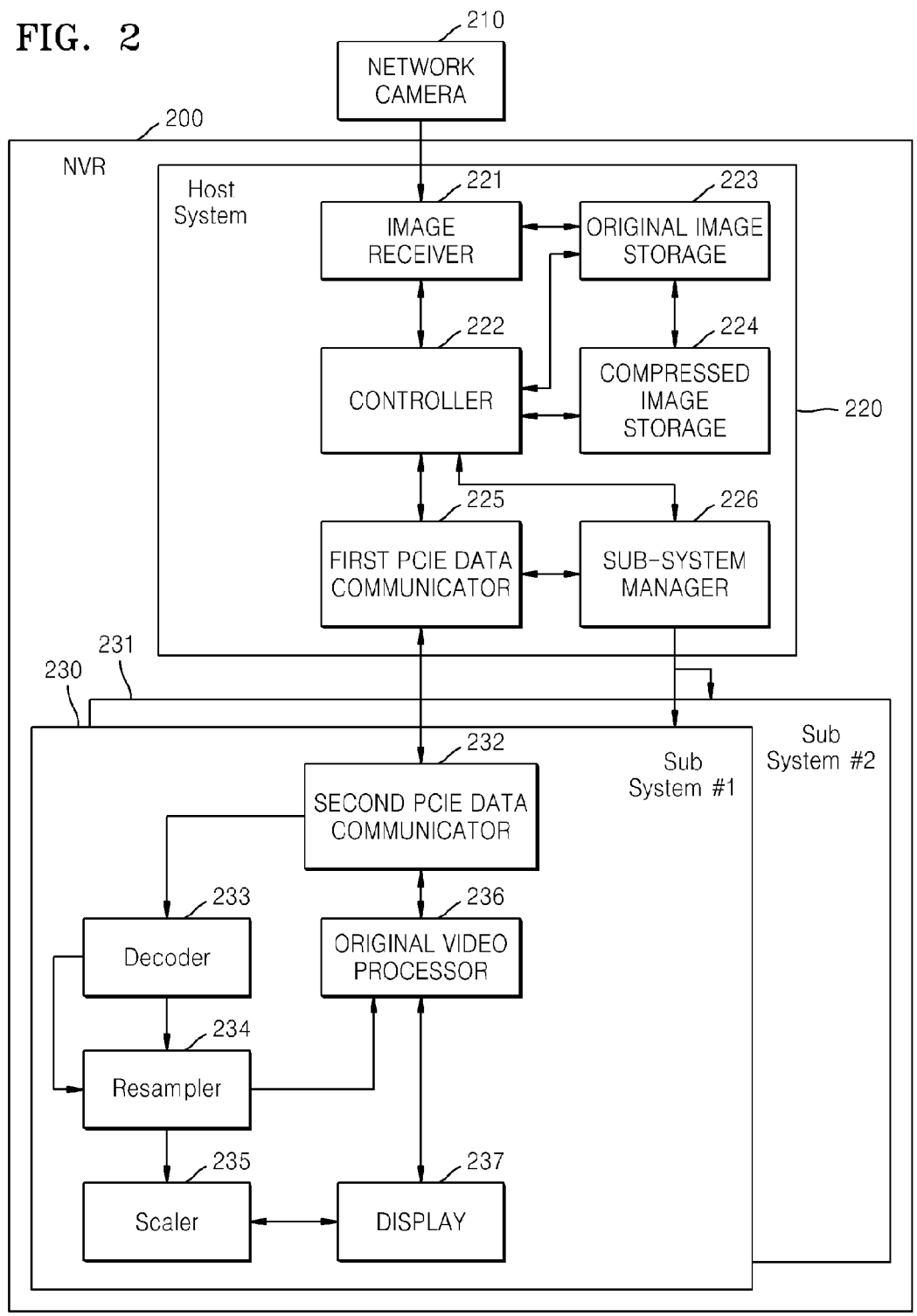
FIG. 2 is an internal block diagram of an image recording system according to an exemplary embodiment.

FIG. 2 is an internal block diagram of an image recording system 200 according to an exemplary embodiment.

The image recording system 200 may be an embedded system. Therefore, a host system 220 and at least one sub-systems 230, 231 may be integrated into a single device in the image recording system 200. According to an exemplary embodiment, the one or more sub-systems 230, 231 may perform decoding, resampling, scaling of an original video image received from a host system 220.

The host system 220 may receive and store a video stream from a network camera 210, and also has a function of storing and controlling a video data received from the network camera 210. The video data from the host system 220 may be transmitted to the one or more sub-systems 230, 231 through a first PCIe data communication unit 225.

The one or more sub-systems 230, 231 may decode the video data received from the host system 220, and output the image to a decoder 233, a resampler 234, a scaler 235, and a display 237 after resampling and scaling the image, or may transmit the image to an original video processor 236 after decoding and resampling the image.

The original video processor 236 may generate a compressed image by setting information or the like, and may transmit the compressed image to the host system 220 through a second PCIe data communication unit 232.

The host system 220 may store a compressed image received from the sub-systems 230, 231 in a specific file format, and read the compressed image in the specific file format according to a reproduction control method such as forward reproduction or backward reproduction. Then, the host system 220 may transmit the compressed image in the specific file format to the sub-systems 230, 231 through the first PCIe data communication unit 225 and the second PCIe data communication unit 232. The one or more sub-systems 230, 231 may output the received compressed image in the specific file format such as video frame on the display 237.

The host system 220 and the one or more sub-systems 230, 231 are described in greater detail below. Further, an example of the sub-system 230 is described in greater detail below for convenience.

According to an exemplary embodiment, the host system 220 includes an image receiver 221, a controller 222, an original image storage 223, a compressed image storage 224, a first PCIe data communication unit 225, and a sub-system manager 226.

The host system 220, in which the original image storage 223 is included, may receive and store a video stream from a network camera 210.

Figure 5:
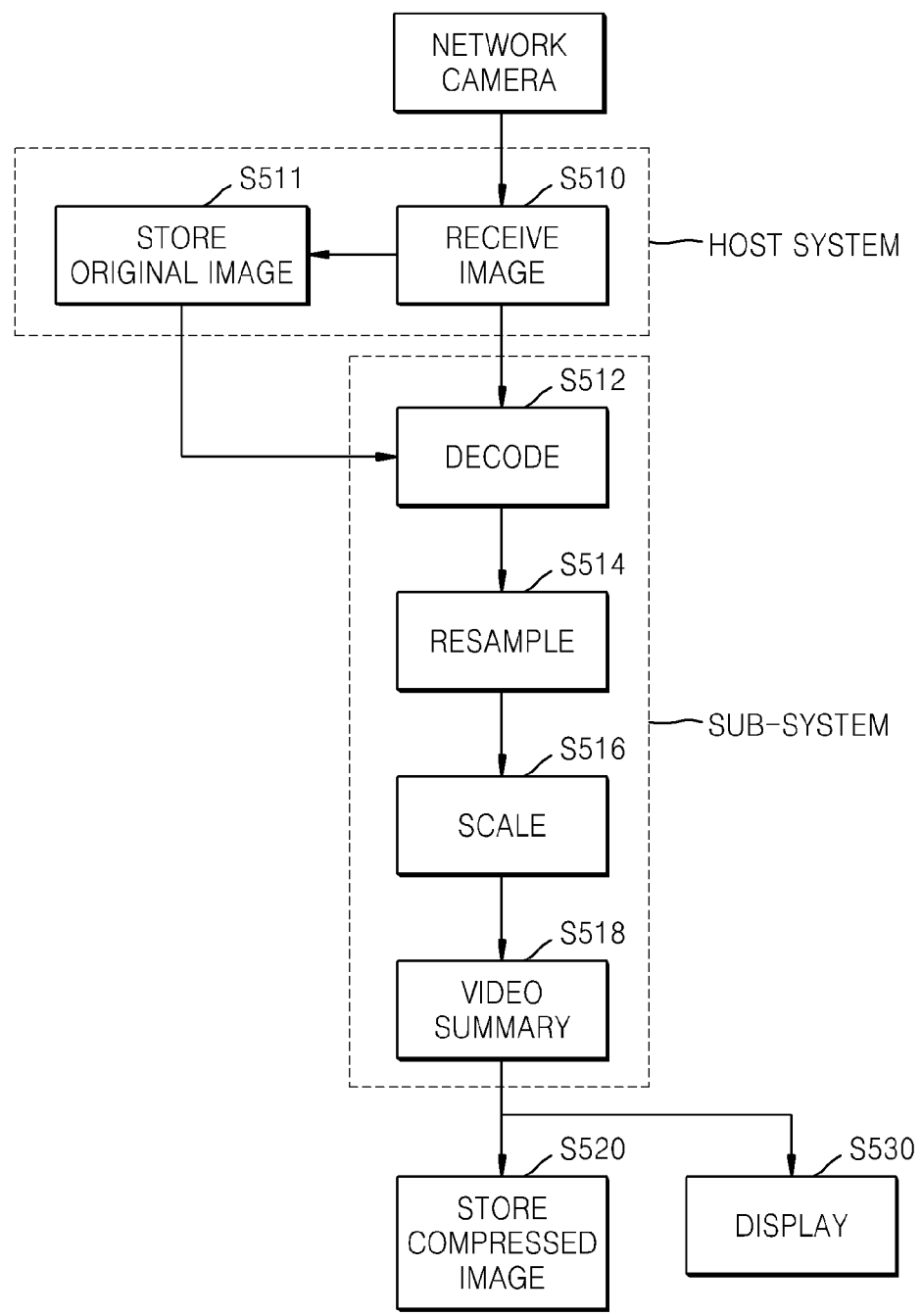
FIG. 5 is a flowchart for describing a method of generating a video summary in an embedded network video recorder (NVR) system which is an example of an image recording system, according to an exemplary embodiment.

Referring to FIG. 5, the image receiver 221 receives an image from the network camera 210 (S510), and stores the image in the original image storage 223 in the host system (S511). The network camera 210 may transmit a high-resolution Full-HD image at 60 FPS to the image receiver 221. However, network cameras of the related art are not suitable for being configured with an embedded system since a relatively high performance processor is required to process such a number of high-resolution image frames with a video summary algorithm.

Thus, according to an exemplary embodiment, the original image is generated by decoding an input image in the sub-system (S512), the original image frame is resampled at a specific interval (S514), the original image frame is scaled to an image size in a range capable of being processed by the original video processor 236 (refer to FIG. 2) (S516), and a video summary is generated (S518).

Said generated video summary is used to generate a compressed image by using setting information with a video summary function, and the compressed image is stored in the compressed image storage 224 in the host system (S520). Thereafter, the stored image is reproduced and displayed by a display in the sub-system (S530).

The first PCIe data communication unit 225 may perform data communication in the host system 520 based on a PCIe communication method, and transmits/receives data to/from the one or more sub-systems 230, 231.

The sub-system manager 226 may manage data transmission with a sub-system connected to the host system 220. The sub-system manager 226 may transmit data to the sub-system or obtain data from the sub-system, depending on the command of the controller 222. The sub-system manager 226 may register a new sub-system and establish a connection with the host system 220. Furthermore, the sub-system manager 226 may terminate the connection between the host system 220 and the sub-system.

The sub-system manager 226 may transmit/receive data to/from the sub-system according to the PCIe method. The sub-system manager 226 may store and manage sub-system information. The controller 222 includes the original image storage 223, the compressed image storage 224, the first PCIe data communication unit 225, and the sub-system manager 226.

The sub-system 230 includes the second PCIe data communication unit 232, the decoder 233, the resampler 234, the scaler 235, the original video image unit 236, and the display 237.

The second PCIe data communication unit 232 may transmit an original video image to the host system 220, and may transmit/receive data to/from the sub-system 230.

The original video image unit 236 generates an original video image of the image received from the host system 220. The decoder 233, the resampler 234, and the scaler 235 may perform functions for video image processing the received image. Because these functions are known to those of ordinary skill in the art, they are not described herein in greater detail.

The original video processor 236 may detect an image frame and time information from the image received from the host system 220, and generate a compressed image frame. The original video processor 236 may detect background information from the image frame, and detect significant motion by using an advanced motion detection (AMD) method. Thereafter, the original video processor 236 may detect object information from the significant motion information.

The object information includes all feature information of people or things. As an example, in the case of a vehicle, all information such as a vehicle type (passenger car, bus, or truck, etc.), vehicle color, and vehicle number may be included in the object information and the feature information.

Significant motion may refer to the motion of people, vehicles, or a specific object, or refer to the motion of a specific object in a specific area. For example, the movement of leaves swaying in the wind or the movement of clouds in the sky is not regarded as significant motion.

The display 237 may display the generated video summary.

Figure 3:
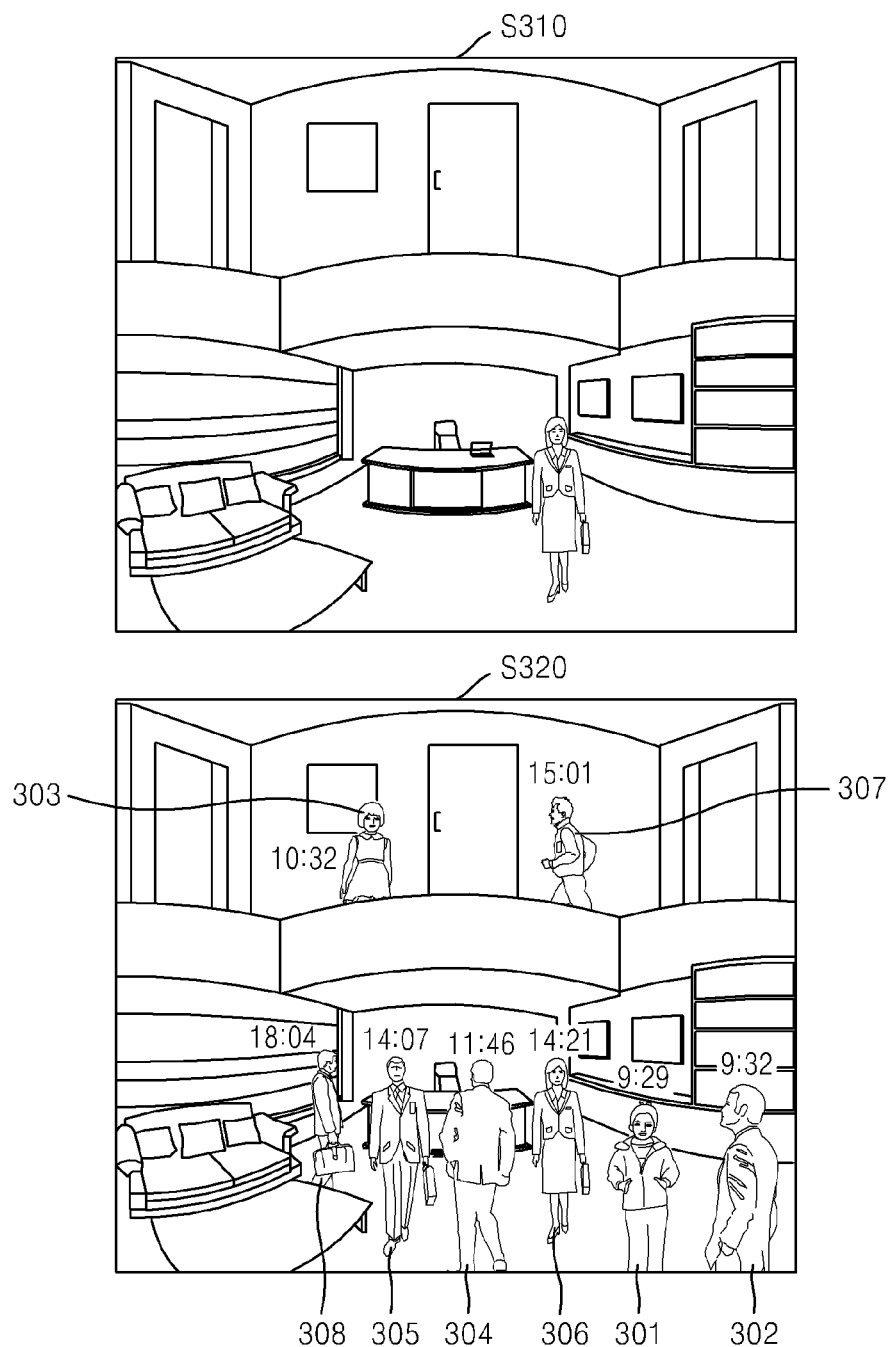
FIG. 3 is a view of an example of an original video image according to an exemplary embodiment.

FIG. 3 shows an example of a video summary, according to an exemplary embodiment.

The video summary is an image including object information that has different time information of an input image and is displayed on a screen. According to an exemplary embodiment, the original video processor 236 (refer to FIG. 2) gathers all the object information within a specific time range of the input image to generate the video summary (S310), and displays the gathered information on a short time image (S320).

The short time image (S320) includes event information including objects 301, 302, 303, 304, 305, 306, 307, and 308 that appear at different times and time information of the object that are displayed on the screen. For example, as shown in FIG. 3, a time of "9:29" is displayed next to object 301.

FIG. 4 is a chart of an object information list of the video summary displayed on a display of an image recording system, according to an exemplary embodiment.

According to the present exemplary embodiment, the object information list may include time information of each object, position information of each object, color information of each object, and size information of each object or user input information.

The object information list 401, 402, 403, and 404 shown in FIG. 4 may be respectively generated corresponding to the each object 301, 302, 303, and 304 in the video summary shown in FIG. 3.

Furthermore, in the video summary, the object information list may include each object's entry time in the form of a timeline corresponding to overlay objects, and may support an interface capable of adding user input information.

According to an exemplary embodiment, when several objects are overlayed in a specific area, a user may use an interface to choose an object that the user wants to see from the object information list as shown in FIG. 4. Furthermore, the user may move to a channel and time of an original image wherein the selected object is stored, and may reproduce the original image by using information of the selected object.

For example, when the user wants to see the object 302 shown in FIG. 3, the user may choose an object list at 09:32 from the object information list and reproduce the original image by moving to the object of the 09:32 in the original image.

According to the present exemplary embodiment, the object information list may divide the object information into a time unit, and may describe information and features of each object at the same time in order to separate the objects overlayed in the same object's entry time.

FIG. 5 is a flowchart for describing a method of generating a video summary in an embedded network video recorder (NVR) system as an example of an image recording system, according to an exemplary embodiment.

An image receiver 221 receives an image from a network camera (S510), and stores the image in an original image storage in the host system (S511).

The network camera may transmit a high-resolution Full-HD image at 60 FPS to the image receiver 221. However, network cameras of the related art are not suitable for being configured with an embedded system since a relatively high performance processor is required to process such a number of high-resolution image frames with a video summary algorithm.

Thus, in the present exemplary embodiment, the original image is generated by decoding an input image in the sub-system (S512), the original image frame is resampled at a specific time interval (S514), the original image frame is scaled to an image size in a range capable of being processed by the original video processor 236 (refer to FIG. 2) (S516), and the video summary is generated (S518).

The video summary is used to create a compressed image obtained by using setting information via a video summary function, and the compressed image is stored in the compressed image storage in the host system (S520). Thereafter, the stored image is reproduced and displayed via the display in the sub-system (S530).

Figure 6:
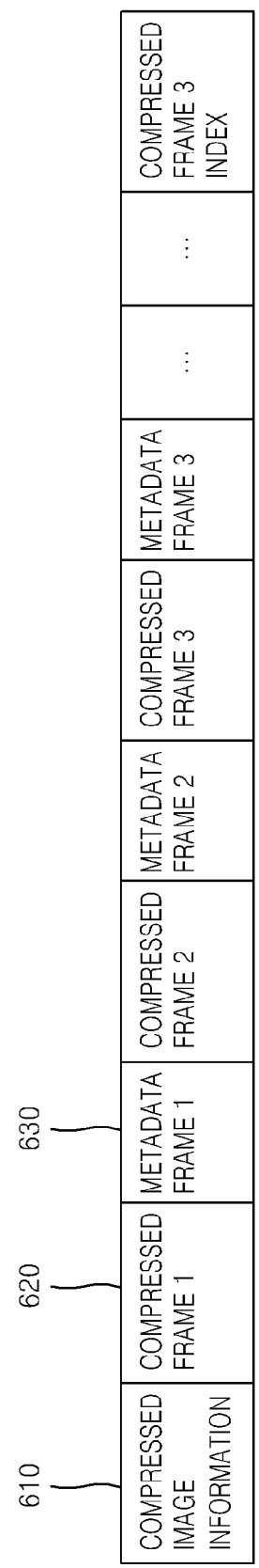
FIG. 6 is a block diagram of an compressed image stream according to an exemplary embodiment.

FIG. 6 is a block diagram of an compressed image stream according to an exemplary embodiment;

The compressed image stream may include video frame header information 610, 630 and a compressed frame 620. The video frame header information 630 may include metadata including compressed time, a channel, image compression condition, codec, resolution, frame rate, the number of frames as a whole in the compressed image, and description information inputted additionally by a user.

Figure 7:
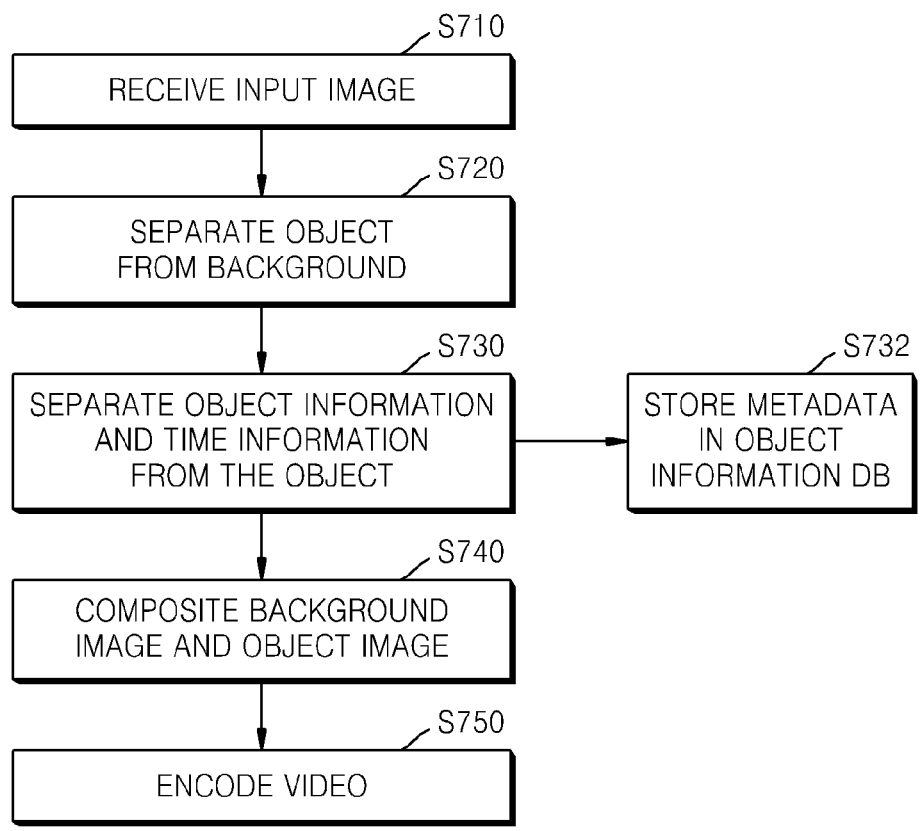
FIGS. 7 and 8 are flowcharts illustrating a method of generating short summary of an original video processor in a sub-system, according to an exemplary embodiment.

FIG. 7 is a flowchart for describing an operation of the original video processor in the sub-system, according to an exemplary embodiment.

When an input image is received (S710), the original video processor detects background information and significant motion event information by using an AMD method. Thereafter, the original video processor detects object information from the motion event information (S720). The object information includes feature information and time information of the object. Furthermore, each pieces of information of the object may be divided into a unique ID and time (S730).

The object information includes a human being, vehicle, and animal. The feature information includes a color, size, and area information of the object. The original video processor configures object information with metadata, and the metadata is stored in a separate object information database (S732).

Thereafter, a compressed image frame is generated by making a background image and an object image (S740), and the compressed image frame generates an image frame by encoding using the metadata (S750).

Figure 8:
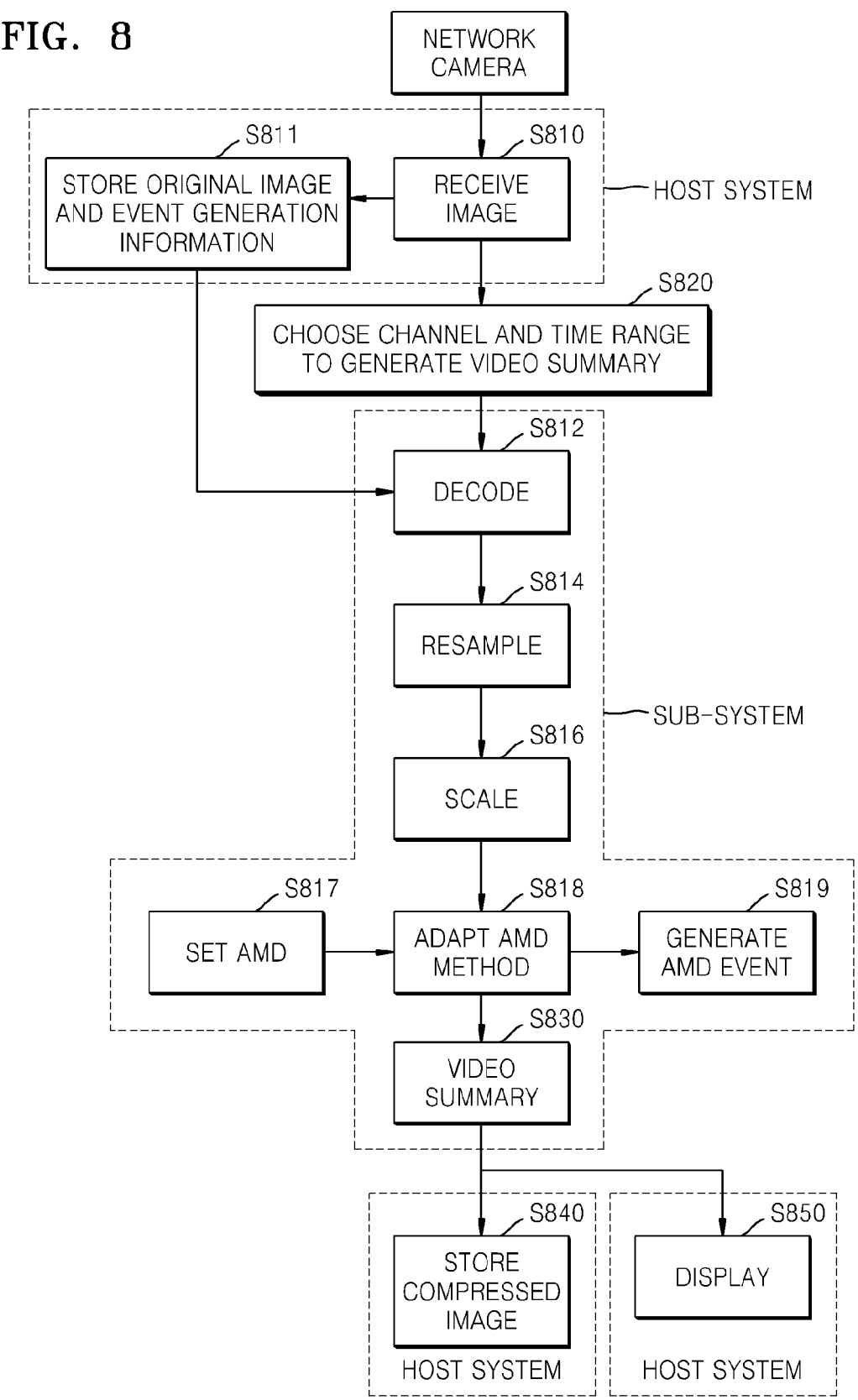

FIG. 8 is a flowchart for describing an operation of the original video processor in the sub-system, according to an exemplary embodiment.

An image receiver receives a real-time image from a network camera (S810), and stores the image in an original image storage in a host system (S811). In this case, the image receiver detects AMD information from real-time image information, and stores the image in the original image storage 223 (refer to FIG. 2) along with event generation information (S811).

Thereafter, a channel and time range to make a compressed video summary image is inputted by a user (S820).

Furthermore, the user may set specific AMD event information, and a threshold corresponding to a specific AMD event generation area and the specific AMD event generation frequency (S817). In this case, only an image time and AMD events matching the threshold set by the user in the stored image are transmitted to the original video processor. As a result, a video summary generation time may be reduced. Thereafter, an AMD method is adapted according to a predetermined condition (S818), and an AMD event is generated by detecting motion event information (S819).

The sub-system decodes an input image and generates an original image (S812), and resamples a frame of the original image with a specific interval.

The original image is generated by decoding an input image in the sub-system (S812), the original image frame is resampled at a specific time interval (S814), the original image frame is scaled to an image size in a range capable of being processed by the original video processor 236 (refer to FIG. 2) (S816), and the video summary is generated (S830).

The generated video summary is compressed and transmitted to the compressed image storage 224 (refer to FIG. 2) of the host system 220 and stored in the compressed image storage 224 (S840). The host system 220 may include a compressed image reproduction unit (not shown in FIG. 2).

The compressed image reproduction unit may analyze the compressed video summary image stored in the compressed image storage 224, and output a frame on the screen in response to an inputted reproduction control (S850). Object information may be outputted at the same time with the object in an image frame of the screen or may be displayed separately on the screen.

When several objects are overlayed in the specific area, the user may choose an object that the user wants to see from the object information list. The user moves to a channel and time of the original image where the selected object is stored, and the original image is reproduced by using information of the selected object.

Figure 9:
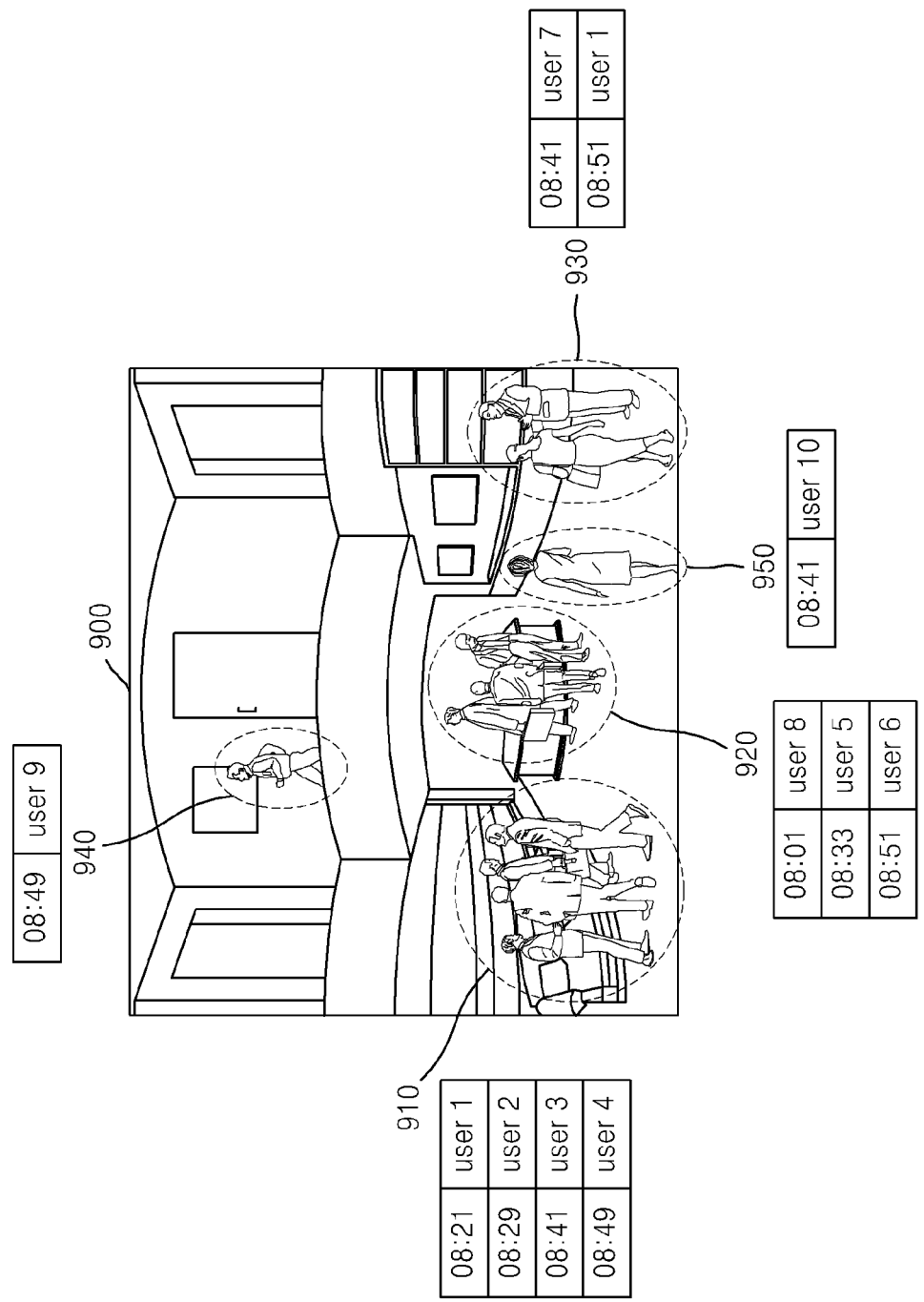
FIGS. 9 through 14 are views of exemplary embodiments of an original video image, wherein the same or different objects are detected in a specific area of an original video image at least once.

FIG. 9 shows a video summary wherein several objects are overlayed in a specific area, according to an exemplary embodiment.

According to an exemplary embodiment, a user provides a video summary of a video image in a specific channel, which is taken during a specific time interval. In this case, all the objects and time information in a specific time range of the video image are displayed on the video summary 900. When several objects are detected in a specific area, the objects are displayed in an overlay state in the video summary display.

According to an exemplary embodiment, when an object is moved within a specific area during a specific time interval, a first detecting point of the object is stored in a video summary.

Referring to FIG. 9, 4 objects (i.e., user 1, user 2, user 3, user 4) are detected near a first detecting point 910. That is, user 1 is detected at 08:21, user 2 is detected at 08:29, user 3 is detected at 08:41, and user 3 is detected at 08:49.

Also, 3 objects (i.e., user 8, user 5, and user 6) are detected near a second detecting point 920. That is, user 8 is detected at 08:01, user 5 is detected at 08:33, and user 6 is detected at 08:51.

In addition, 2 objects (i.e., user 7 and user 1) are detected near a third detecting point 930. That is, user 7 is detected at 08:41, and the user 1 is detected at 08:51. In this case, the user 1 is detected near the first detecting point 910 at 08:21, and detected again near the third detecting point 930 at 8:51. Put another way, the user 1 is detected in a specific area at a first time, and is detected again in the specific area at a second time, after leaving the specific area.

In addition, user 9, that is, one object, is detected near a fourth detecting point 940 at 08:49, and user 10, that is, one object, is detected near the fifth detecting point 950 at 08:41.

Figure 10:
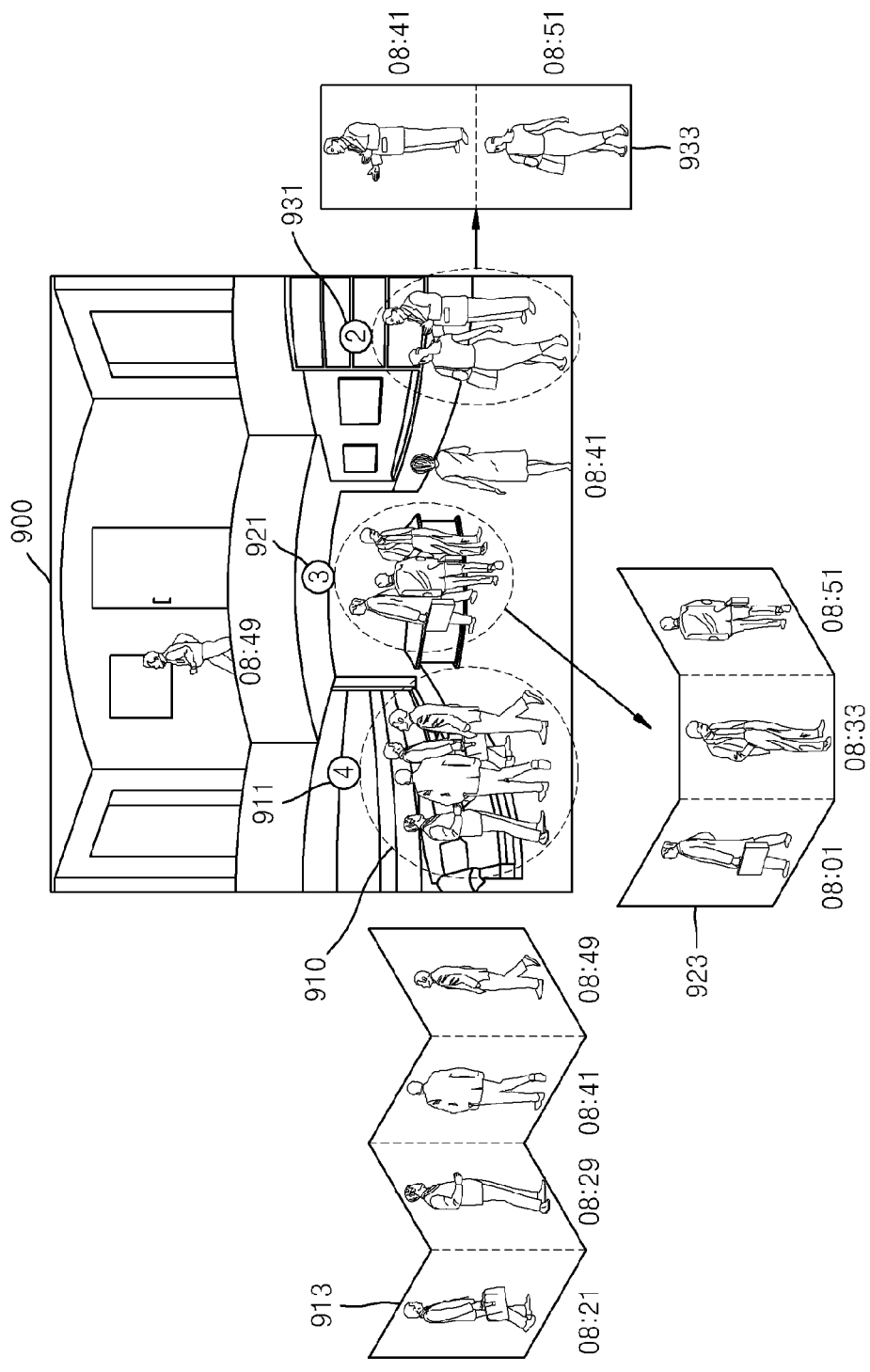

FIG. 10 shows an example of a video summary in which object lists are shown to a user in a case where several objects are overlayed in a specific area, according to an exemplary embodiment.

According to an exemplary embodiment, when several objects are overlayed in a specific area, the number of objects may be displayed in the specific area. Referring to FIG. 10, the user may understand from indicators 911, 921, and 931 that the objects are overlayed. The indicators 911, 921, and 931 may overlap in the specific areas 910, 920, and 930, or be displayed in an area near each of the specific areas 910, 920, and 930.

For example, "4" may be displayed on the first detecting point 910, "3" may be displayed on the second detecting point, and "2" may be displayed on the third detecting point 930.

According to an exemplary embodiment, when the user touches or chooses the area in which objects are overlayed or when the user chooses the indicators 911, 921, and 931, the overlay objects may be displayed on the screen.

For example, when the user chooses the specific area, time information and image information of the each object that are displayed by being overlayed on the screen may be displayed in the form of a two or three-dimensional thumbnail or in the form of at least one from among a hierarchical list, a panorama icon, a circle, and a polyhedron.

An exemplary embodiment shown in FIG. 10 shows methods of displaying overlay objects.

According to an exemplary embodiment, an object information list of a video summary may be displayed as shown in FIG. 4.

According to another exemplary embodiment, when a user touches or chooses overlay objects, an information list of the overlay objects may be displayed on a screen. In this case, the information list of the overlay objects may be displayed in a form of the chart as shown in FIG. 4.

According to an exemplary embodiment, an information list of an object may be displayed in a planar form of a laterally extending display 913, 923, or in a planar form of a longitudinally extending display 933. The information list of the object may be displayed in three-dimensional forms 913, 923 having an unlimited number of planes. The three-dimensional form may be a polyhedron, and corresponding object information may be displayed on each surface of the polyhedron. In this case, the object information may display at least one or more among an image of the object, position information of the object, time information of when the object appears, feature information of the object, and any other information.

When the information list of the object is displayed on a polyhedron, overlay objects may be displayed on each surface of the polyhedron respectively.

Figure 11:
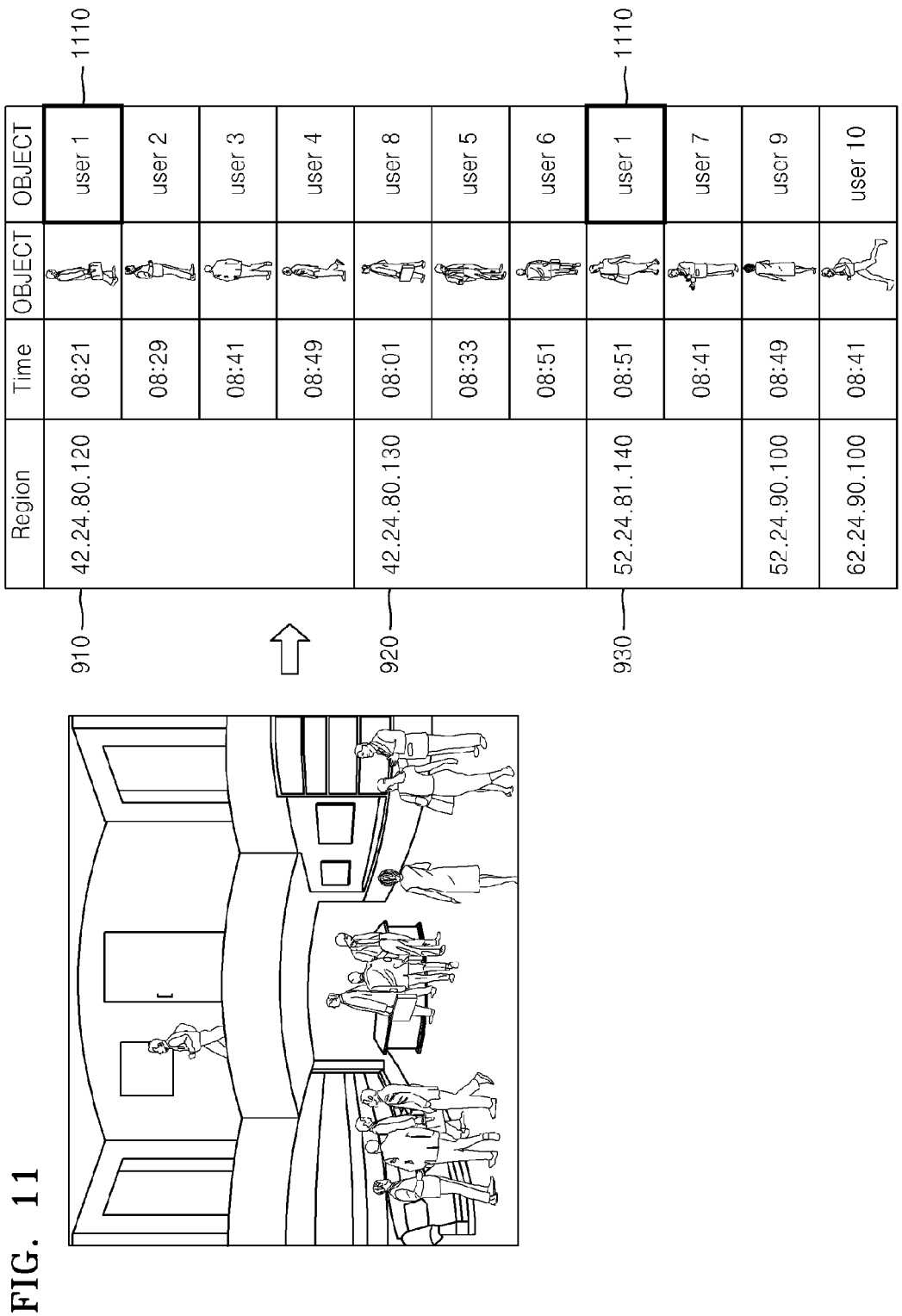

An exemplary embodiment shown in FIG. 11 shows an example of object list displayed in a chart form. In this case, the object list may be displayed on the screen in the order of increasing number of overlay objects, based on a selection by a user.

For example, the order in the object list is as follows. The information of the first detecting point (42.24.80.120) 910 in which 4 objects are overlayed, may be listed on top of the chart. And the information of the second detecting point (42.24.80.130) 920 in which 3 objects are overlayed, may be listed under the information of the first detecting point. Next, the information of the third detecting point (52.24.81.140) 930 in which 2 objects are overlayed, may be listed under the information of the second detecting point.

Figure 12:
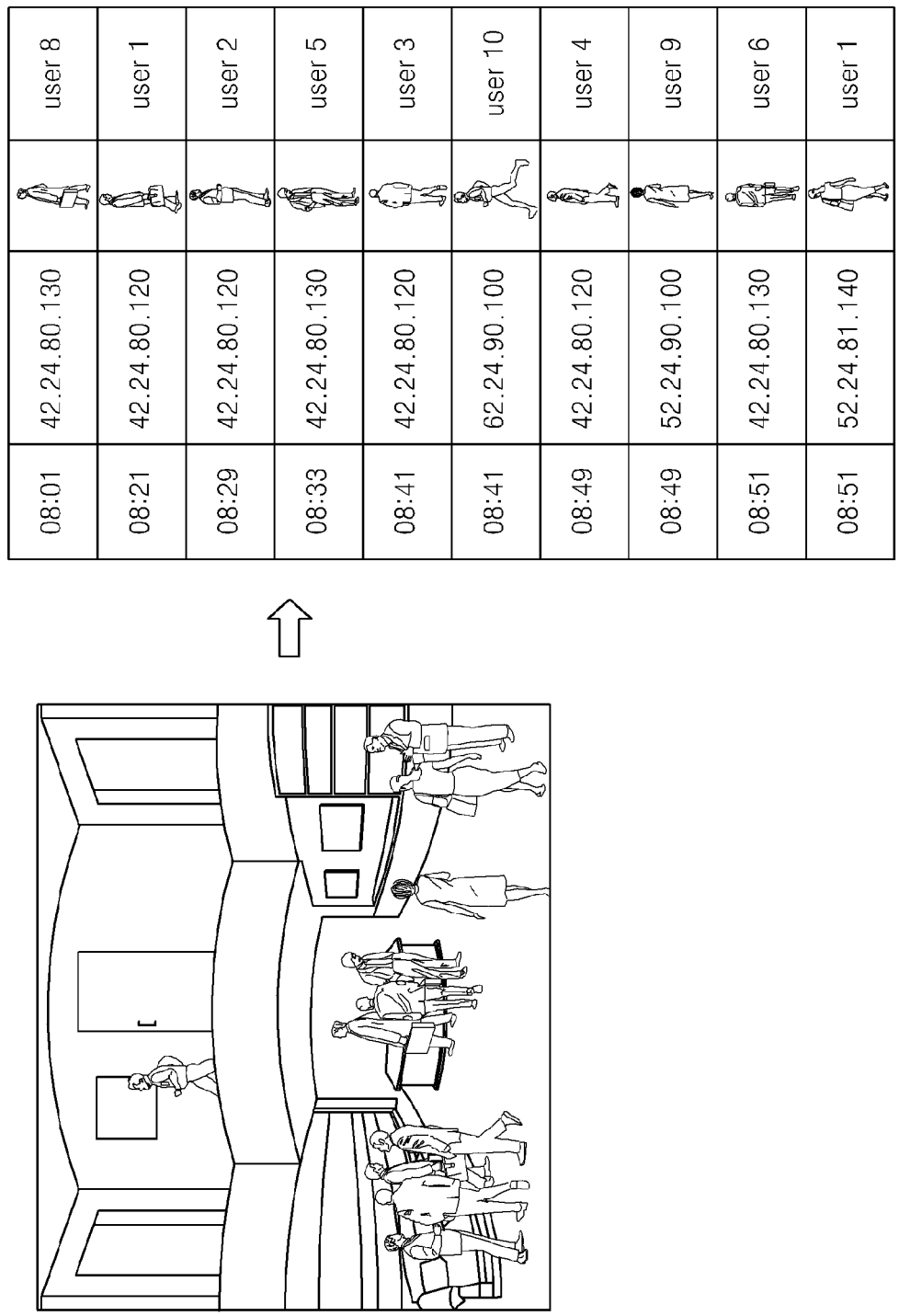

FIG. 12 shows another example of a video summary arranged based on time, according to an exemplary embodiment. When a user requests a video summary in a 08:00~09:00 time interval, the video summary information may be listed in the order of time. Thereafter, \ the synopsis video may be displayed by displaying objects at their respective specified time.

Figure 13:
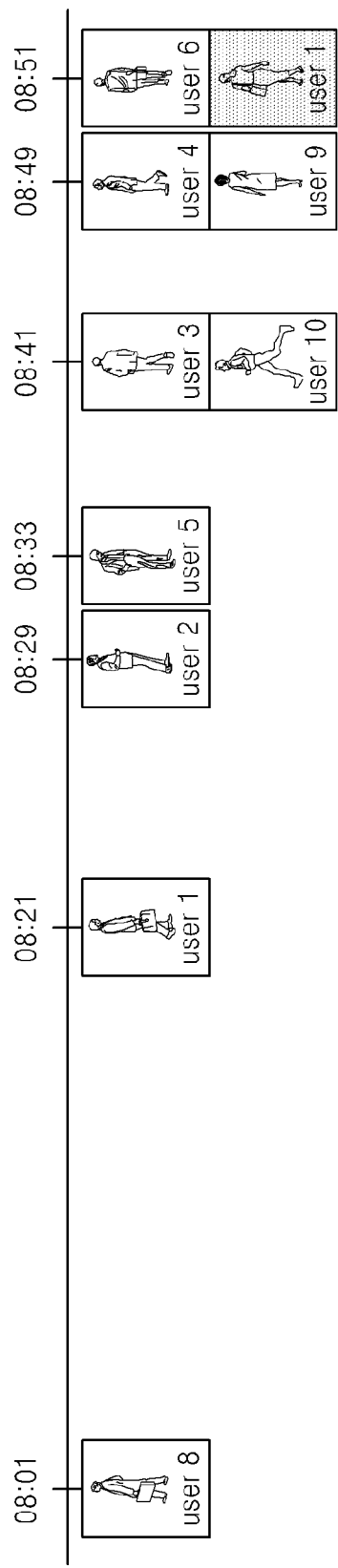

FIG. 13 shows another example of the video summary arranged based on time, according to an exemplary embodiment. The video summary displays a timeline, and further displays detected object information on the timeline. In this case, when one or more objects are detected at a specific time, the video summary may display each of the object information at the corresponding specific times. Furthermore, the detected images of each object may be displayed in the form of a thumbnail. In addition, the detected object information may be displayed on the screen at the same time.

Figure 14:
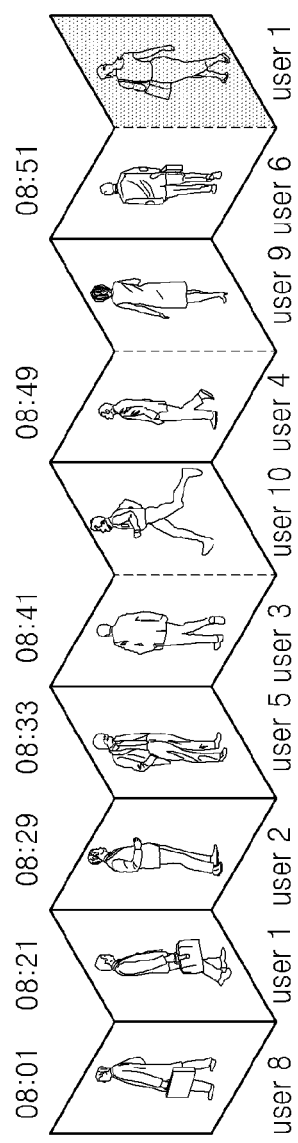

FIG. 14 shows another example of the video summary in the order of time, according to an exemplary embodiment. In FIG. 13, the video summary is displayed on the timeline, and a timeline part having no objects detected at specific time, is empty.

The video summary shown in FIG. 14, unlike FIG. 13, is not empty. Instead, the video summary displays the video summary based on an order of the time when each event is detected. When the video summary is displayed in the order of time of when an event is detected as shown in FIG. 14, the video summary is able to be displayed in three-dimensional form. In FIG. 14, the video summary is displayed in a form of a laterally extending display. It should be noted that the video summary may also be deformed and displayed in a form of a longitudinally extending display, a polyhedron display, or a multidimensional display.

As described above, according to the one or more of the above exemplary embodiments, the image recording system generates the original video image in the NVR without separate servers. Furthermore, in the original video image, the image recording system generates a list of each object's entry time corresponding to overlay objects in the form of a timeline, and supports an interface capable of adding opinions or comments of a user. Thus, the overlay objects may be clearly distinguished even if the objects are overlayed repeatedly in the same object's entry time.

In addition, other exemplary embodiments can also be implemented through computer readable code/instructions in/on a medium, e.g., a computer readable medium, to control at least one processing element to implement any of the above described exemplary embodiments. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more exemplary embodiments. The media may also be a distributed network, so that the computer readable code is stored/transferred and executed in a distributed fashion. Furthermore, the processing element may include a at least one processor or a computer processor, and processing elements may be distributed and/or included in a single device. It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept, as defined by the following claims.

What is claimed is:

1. An image recording system comprising:
a host system and at least one sub-system configured communicate with each other using a peripheral component interconnect express (PCIe) communication method,
wherein the host system is further configured to store an original image acquired by at least one network camera and a compressed video summary image of the original image,
wherein the at least one sub-system is further configured to receive the original image from the host system, process the original image, and generate a video summary corresponding to a specific time interval of the original image,
wherein the image recording system is configured to display the video summary which comprises object information of an object detected by an advanced motion detection (AMD) method during the specific time interval of the original image and time information of the object, and
when more than one object is detected in a specific area of the displayed video summary during the specific time interval, the detected objects are displayed in an overlay state in the specific area.

2. The image recording system of claim 1, wherein the displayed video summary comprises all of the objects detected using the AMD method and detection time information of each of the objects during the specific time interval.

3. The image recording system of claim 1, wherein when more than one object is detected in the specific area, an indicator showing the number of the detected objects is displayed in one of the specific area and an area near the specific area, using an overlapping display method.

4. The image recording system of claim 1, wherein when more than one object is detected in the specific area, time information and image information of each of the detected objects is displayed in an overlay state in the specific area.

5. The image recording system of claim 4, wherein when a user selects the specific area, the time information and the image information of the each of the objects are displayed as a two or three-dimensional thumbnail and in the form of at least one from among a hierarchical list, a panorama icon, a circle, and a polyhedron.

6. The image recording system of claim 5, wherein the thumbnail comprises the image information of the object, the object information of the object, and time information corresponding to a time when the object appears, and wherein the object information comprises at least one of color information of the object, size information of the object, and area information of the object.

7. The image recording system of claim 1, wherein when more than one object is detected in the specific area, all of the detected objects are displayed in a timeline form when the user selects the specific area.

8. The image recording system of claim 5, wherein when all of the detected objects are displayed in the form of the polyhedron, each of the detected objects is displayed in an overlay state on each surface of a polyhedron.

9. The image recording system of claim 1, wherein the video summary corresponding to the specific time interval comprises event information detected by the AMD method during the specific time interval displayed in a time sequential order starting from a time when an event is generated.

* * * * *